United States Patent
Bakker

(10) Patent No.: US 8,708,784 B2
(45) Date of Patent: Apr. 29, 2014

(54) METHOD AND APPARATUS FOR PROCESSING POULTRY SUSPENDED BY THE FEET FROM A CONVEYOR HOOK

(75) Inventor: Simon Bakker, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 1094 days.

(21) Appl. No.: 12/527,370

(22) PCT Filed: Jan. 14, 2008

(86) PCT No.: PCT/NL2008/050026
§ 371 (c)(1),
(2), (4) Date: Mar. 1, 2010

(87) PCT Pub. No.: WO2008/100138
PCT Pub. Date: Aug. 21, 2008

(65) Prior Publication Data
US 2010/0151779 A1 Jun. 17, 2010

(30) Foreign Application Priority Data
Feb. 15, 2007 (NL) ...................................... 2000489

(51) Int. Cl.
*A22C 21/00* (2006.01)
(52) U.S. Cl.
USPC .......................................................... 452/71
(58) Field of Classification Search
USPC ......... 452/52, 53, 71, 74, 79, 80, 87–89, 106, 452/107
See application file for complete search history.

(56) References Cited

U.S. PATENT DOCUMENTS

| 3,522,622 A | | 8/1970 | Crane | |
|---|---|---|---|---|
| 3,696,464 A | * | 10/1972 | Dillon et al. | 452/167 |
| 3,805,328 A | * | 4/1974 | Strandine et al. | 452/54 |
| 4,102,015 A | | 7/1978 | Herrick | |
| 5,514,033 A | * | 5/1996 | Berry | 452/182 |
| 6,623,346 B2 | * | 9/2003 | Lee | 452/53 |
| 7,134,956 B2 | * | 11/2006 | Lee | 452/53 |
| 7,670,212 B1 | * | 3/2010 | Thompson et al. | 452/133 |
| 8,202,143 B1 | * | 6/2012 | Taylor | 452/166 |
| 2003/0190880 A1 | | 10/2003 | Haley | |
| 2005/0059332 A1 | | 3/2005 | Berry | |

FOREIGN PATENT DOCUMENTS

EP 1 374 686 A 1/2004

OTHER PUBLICATIONS

PCT International Search Report for PCT/NL2008/050026, May 14, 2008.
PCT International Preliminary Report on Patentability for PCT/NL2008/050026, Mar. 30, 2009.
Article: "Foot Pad Dermatitis and Hock Burn in Broiler Chickens and Degree of Inheritance," Poultry Science, vol. 85, No. 8 Aug. 2006, pp. 1342-1348; document from Database Biosis.

* cited by examiner

*Primary Examiner* — Richard Price, Jr.
(74) *Attorney, Agent, or Firm* — Dority & Manning, P.A.

(57) ABSTRACT

A method for processing poultry suspended by the feet from a conveyor hook is provided. The method and apparatus allow the quality of the poultry to be classified and graded in a simpler and more effective manner to realize higher yields or an extra added value. In one exemplary embodiment a processing apparatus for a foot of the poultry is provided that includes a foot pad inspection apparatus.

11 Claims, 5 Drawing Sheets

METHOD AND APPARATUS FOR PROCESSING POULTRY SUSPENDED BY THE FEET FROM A CONVEYOR HOOK

FIELD OF THE INVENTION

The present invention relates to an apparatus and a method for processing poultry suspended by the feet from a conveyor hook.

BACKGROUND OF THE INVENTION

Method and apparatus for processing poultry are known, for example, from applicant's earlier European patent application EP-B-1 302 110, the entire contents of which are incorporated herein by reference. In addition, U.S. App. Pub. No. 2003/0190880 shows a method for processing poultry suspended by the feet from a conveyor hook and includes severing the claw from a foot after the foot is has been turned into a predetermined position in relation to the conveyor hook. In U.S. Pat. No. 3,552,622, an apparatus is indicated for processing poultry suspended by the feet from a conveyor hook, including an apparatus for processing a foot of this poultry.

One objective in the design of a method and apparatus for processing poultry is to allow the quality of the poultry to be classified and graded in a simpler and more effective manner and, as a consequence, to realize higher yields or an extra added value. For example, an invention that surpasses the yield and added value of the method and apparatus disclosed in the European patent application EP-3-1 139 769 would be useful. Another goal would be to objectify the results of the classification and grade of the poultry, making it less dependant on the personal opinion of the individual inspectors.

The present invention is directed at these and other objectives as will become apparent in the description that follows.

SUMMARY OF THE INVENTION

The invention is embodied in a method and apparatus set forth in the claims that follow.

Within the frame of the invention, processing includes an inspection of the foot pad, cleaning the foot pad, the removal of a horny layer from the foot pad, the removal of nails from the toes of the claw, and combinations of these, or other processes. This provides a significant added value, especially in countries where the feet are eaten.

In order to facilitate such processing in a production environment, it is desirable for the foot with the claw to be turned into a predetermined orientation in relation to the conveyor hook, so as to ensure that the claw is open during processing. An "open claw" is understood to be a claw of which the toes are not contracted. According to the invention, therefore, the method is directed at avoiding that the muscles at the rear side of the foot, in particular the musculus flexor digitorum longus and the musculus flexor hallucis longus, are tensed such as to cause the claw to close.

If processing involves a foot pad inspection, this inspection may conveniently be facilitated by cleaning the foot pad of the claw and/or removing a horny layer from the foot pad prior to inspecting the foot pad.

To promote the above-mentioned open condition of the claw to be processed, it is desirable for the foot to be placed in a predetermined orientation in relation to the conveyor hook, such that an angle between the foot and the conveyor hook is smaller than 180°. The best result is obtained when the angle between the feet and the hook is approximately 90°.

For an optimal execution of the method according to the invention in a production environment in which the poultry is conveyed in a high-speed line, it is advantageous for adjusting the foot in relation to the conveyor hook that the poultry is moved from a starting position, in which it is oriented perpendicularly or is suspended freely by the feet from the conveyor hook, to an orientation where the feet are suspended obliquely from the conveyor hook, in which position the feet in relation to the carcass of the poultry have substantially a same orientation as in said starting position. It should be noted that these method steps are equally useful at low line speeds of the conveyor hooks and even when the conveyor hooks are stationary. However, the advantages of this measure become particularly manifest with high-speed lines. With low-speed lines or with stationary conveyor hooks, it is also possible to perform the desired processing step manually. The inspection of the foot pad may then, for example, be carried out by an inspector, without using visual aids.

As already mentioned, the treatment of the claw of a foot may relate to carrying out a foot pad inspection. This processing step, but also other processing steps are facilitated by adjusting the foot as explained above, such that the claw of the foot is open.

It should be noted that the inspection of a foot pad as such is known from the article "Prevalence and control of foot pad dermatitis in broilers in Sweden" by the authors C. Ekstrand, T. E. Carpenter, I. Andersson en B. Algers, published in *"British Poultry Science"*, 1998, no. 39, pp. 318-324. However, this article concerns a statistics study that is not applicable in a production environment in which poultry, after having been slaughtered, has to be scalded, plucked, eviscerated, jointed, and made ready for retail at a high tempo.

In order to avoid as much as possible that inspection results are influenced by personal opinions, and to facilitate a high-speed foot pad inspection, it is desirable to perform the foot pad inspection using an image recorder, preferably a camera, for obtaining an image recordal of the foot pad.

The aforementioned measure makes it possible and advantageous to subject the images obtained with the image recorder to image-identification and -classification, in order to sort the poultry into a predetermined quality grade. This sorting may also be performed manually or automatically.

A particular aspect of the invention relates to a foot pad inspection of which the results are gathered and classified, so that they may form a basis for adjusting the feed and/or living conditions of poultry to be slaughtered and processed later.

To effectively utilize the results of the foot pad inspection in a production line it is desirable that, depending on the results from the foot pad inspection, at least one processing apparatus of a slaughter line for poultry is employed, and/or such a processing apparatus of the slaughter line is activated or deactivated, and/or to cause the poultry to bypass such a processing apparatus of the slaughter line. Such a processing apparatus may, for example, be an ejection device wherein the poultry can optionally be removed from the conveyor line.

It should be noted, that the use of the image recordal obtained both by human involvement and automatically—by coupling the image recorder with control means—may lead to an adjustment of the control means depending on the obtained image recordal for the control of the slaughter line for poultry.

As already mentioned above, the invention is also embodied in an apparatus for processing poultry suspended by the feet in a conveyor hook, and possesses a processing apparatus for a foot of the poultry.

The processing apparatus is preferably selected from the group comprising a positioning device for a foot of the poultry and a foot pad inspection apparatus.

Advantageously, the positioning device is effective for carrying out other processing steps such as the previously mentioned foot pad inspection (with or without visual aids) or other processing steps on (the claw of) the foot.

The afore mentioned foot pad inspection apparatus preferably comprises an image recorder for obtaining an image recordal of the foot pad, and more preferably, it is provided with an image identification and classification device coupled with the image recorder for sorting the poultry into a predetermined quality or grade category. Based on this classification it is possible to manually or automatically adjust the processing apparatuses of a slaughter line to a desirable setting.

The advantages in a production line afforded by the invention are especially enhanced by embodying the apparatus with control means that are coupled with the image recorder for, depending on the image recordal obtained, adjusting at least one processing apparatus of the slaughter line for the poultry and/or activating or deactivating such a processing apparatus of the slaughter line and/or causing the poultry to bypass such a processing apparatus of the slaughter line.

In order to promote the reliability and effectiveness of a desirable processing step of the poultry in the apparatus, the same is provided with a positioning device for positioning the foot of the poultry in relation to the conveyor hook in which said foot is placed.

It is in this respect desirable for the positioning device to be designed to position the foot in relation to the conveyor hook such that the claw is open, that is to say that the foot pad is visible.

In this respect it is preferred for the positioning device to be designed to position the foot of the poultry in relation to the conveyor hook such as to form an angle smaller than 120°. Optimal results may be achieved if the angle between the foot and the hook is approximately 90°.

A preferred embodiment of the apparatus includes a positioning device that possesses at least one first guide against which, during operation, a poultry carcass rests, and which first guide moves this carcass from below the conveyor hook to outside the path of the conveyor hook, while the feet of the poultry remain in contact with the conveyor hook. It should be noted that the path of the conveyor hook may be rectilinear such that the poultry is moved outside the plane of movement in which the conveyor hook travels. The path may, however, also be curved if the conveyor hook describes, for example, a circular path. The poultry suspended from the conveyor hook must then also move in a circular path, of which the radius deviates from the radius of the path travelled by the conveyor hook.

In order to avoid the poultry moving out of alignment or hanging out of alignment, it is desirable in the aforementioned preferred embodiment where the conveyor hook has a rectilinear or curved path, that the at least one first guide is a movable guide, moving synchronously with the movement of the poultry suspended from the conveyor hooks.

It is further advantageous for the conveyor hook to cooperate with a guide for maintaining a vertical orientation of the conveyor hook. This prevents the conveyor hook from hanging out of plumb when the poultry is moved outside the path of the conveyor hook.

Another advantageous measure relates to the use of a locking device for the feet of the poultry in the conveyor hook. This prevents the feet being lifted out of the conveyor hook when the poultry is moved outside the path of the conveyor hook.

The just referred to locking device may be easily realized by means of a blocking rod extending near and above the lower side of the conveyor hook such that during operation, the feet of the poultry are situated directly beneath the blocking rod.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures by way of non-limiting examples of the invention, in which.

Identical reference numerals in the figures refer to similar components.

DETAILED DESCRIPTION

Figure 1:
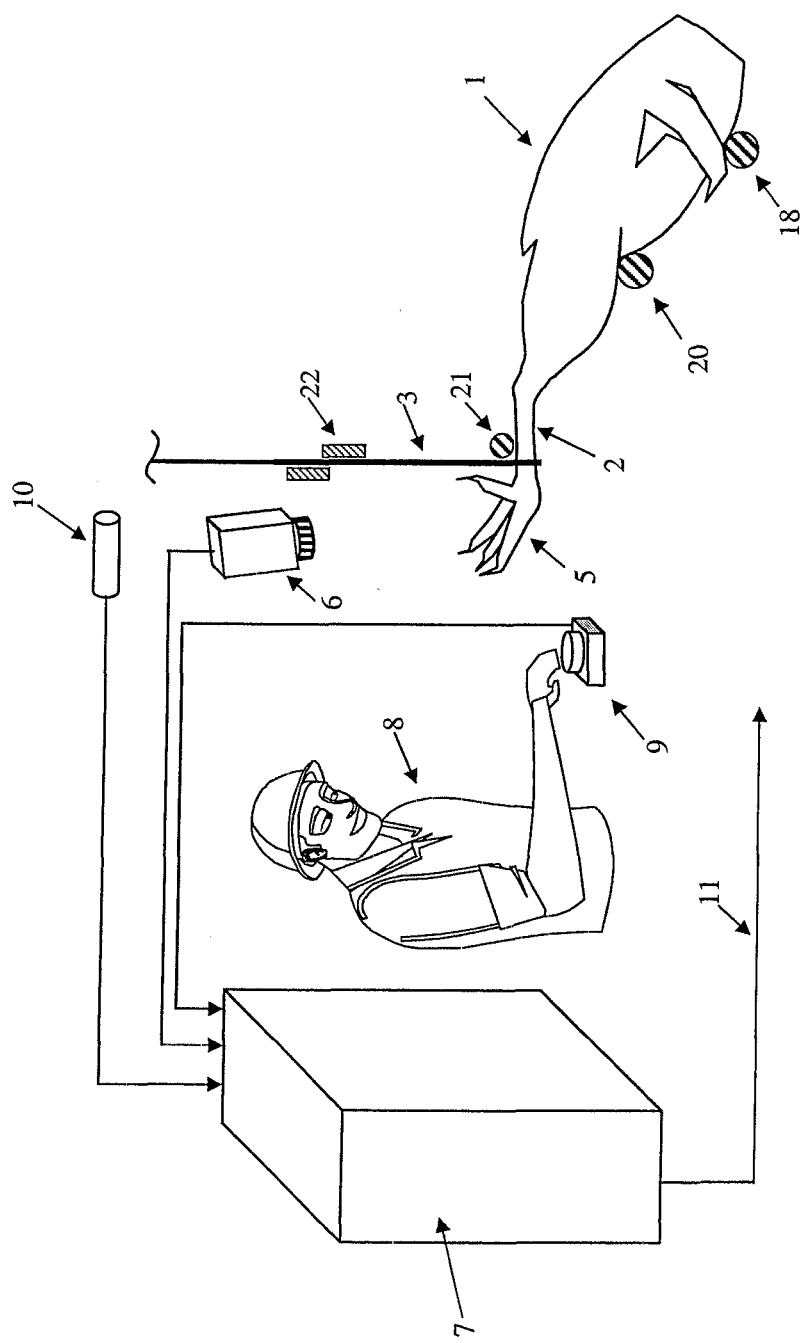
FIG. 1 provides an exemplary embodiment of a method and apparatus of the present invention, wherein as a processing step a foot pad inspection is performed.

The present invention relates to an apparatus and a method for processing poultry suspended by the feet from a conveyor hook. For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Figure 3C:
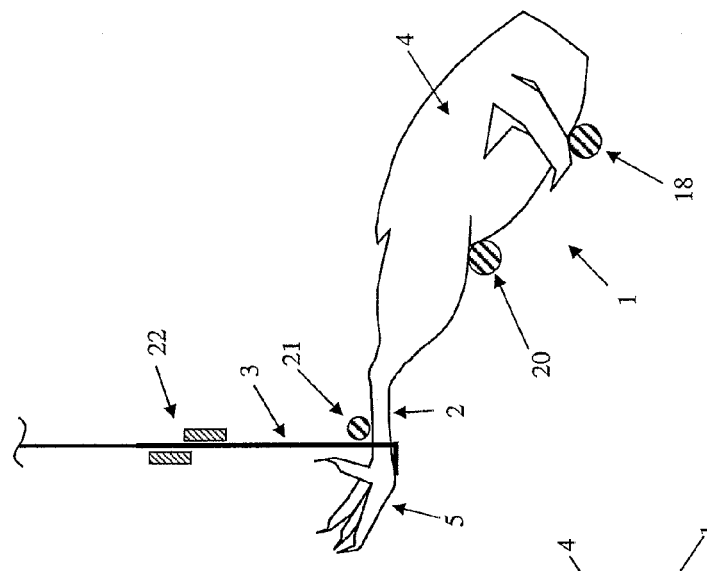
FIGS. 3A, 3B and 3C illustrate poultry as suspended in various positions from an exemplary conveyor.
Figure 3B:
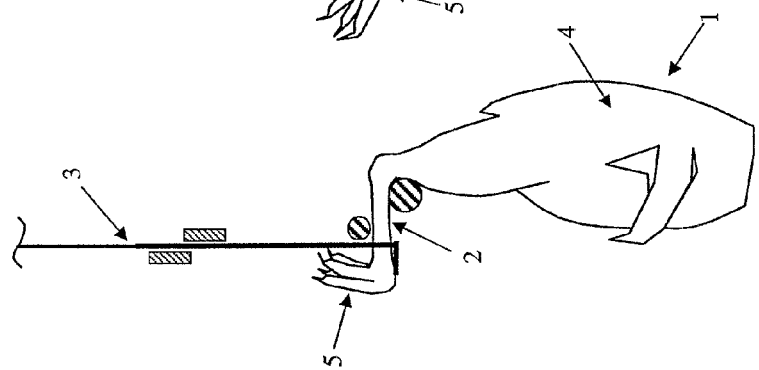
Figure 3A:
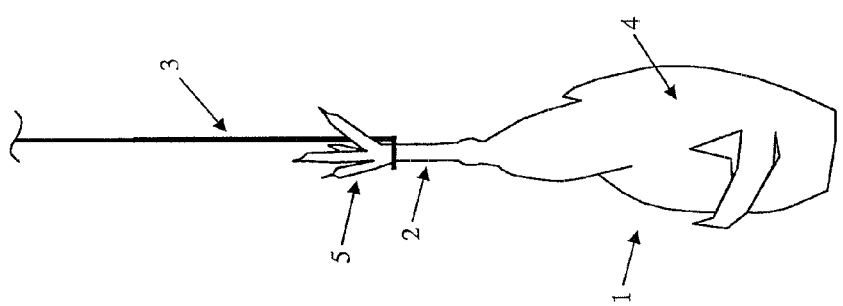

Referring now to FIG. 3A, poultry 1 is shown suspended by the feet 2. To this end the feet 2 are received in a conveyor hook 3, which is suspended from a chain conveyor 13 (FIG. 4), moving the poultry 1 past various processing stations for processing the poultry 1 into ready-for-sale products. For example, one such a processing station may be an ejector for removing poultry from the line.

At the end of the feet 2 facing away from the carcass 4 of the poultry 1 are the claws 5. At the underside of the claws 5 are the foot pads, which in accordance with an exemplary aspect of the present invention are subjected to a foot pad inspection. Other additional processing steps are also possible.

As shown in FIG. 3C, for the purpose of foot pad inspection, the carcass 4 of the poultry 1 is preferably moved from under the conveyor hook 3 and outside the path of this conveyor hook 3, while the feet 2 remain in contact with the conveyor hook 3. This makes it possible to ensure that the foot 2 in relation to the conveyor hook 3 is placed in a predetermined position wherein the claw 5 is open, which is convenient for a processing step to be carried out such as a foot pad inspection as shown in this example. It is desirable for the orientation of the feet 2 in relation to the carcass 4 of the poultry 1 to remain substantially the same as in the starting position shown in FIG. 3A.

As a comparison, FIG. 3B shows a situation in which the poultry 1 is moved next to the path of the conveyor hook 3 but in which the orientation of the feet 2 in relation to the carcass 4 of the poultry 1 is very different to the starting position shown in FIG. 3A. A consequence of the position shown in FIG. 3B is that if the feet 2 are oriented as shown, the musculus flexor digitorum longus and the musculus flexor hallucis longus, cause the toes of the claw 5 to bend so that the claw 5 is no longer open.

Referring to FIG. 1, in which the poultry 1 is shown with the foot 2 placed in a predetermined orientation in relation to the conveyor hook 3, care is taken that the claw 5 is open. FIG. 1 shows that a foot pad inspection of the claw 5 is being performed with the aid of an image recorder 6. This foot pad inspection may also be carried out by the operator 8 without using the image recorder 6.

In the apparatus shown in FIG. 1, the image recorder is a camera 6. Prior to the foot pad inspection using the camera 6, it may be advantageous to clean the foot pad of the claw 5 and/or remove a horny layer from the foot pad. However, these may also be the only processing steps to be carried out.

The image recorder 6 is coupled with an image identification and classification device 7 for sorting the poultry into a predetermined quality grade. This image identification and classification device 7 may to this end be equipped with, for example, a monitor showing degrees of anomalies of foot pads, and simultaneously showing actual measurements of a claw 5 of the poultry 1 taken with the image recorder 6. By means of button control 9, an operator 8 is then able to decide into which quality class the poultry 1 belongs. The data obtained and the quality classification may then be used, for example, to adapt the living conditions or the feeding pattern of the poultry still to be slaughtered and processed.

On the basis of, among other things, a measuring sensor 10, the conveyor hook 3 from which the poultry 1 is suspended is individualized to enable the image identification and classification device 7 to steer control means (not shown), which—in accordance with the images obtained via the image recorder 6—will adjust the slaughter line, in particular certain processing apparatuses thereof, in order to subject the poultry or refrain from subjecting the poultry in question to a desirable processing step relevant for that particular quality grade. Signal line 11 symbolizes the steering of the control means.

Figure 2:
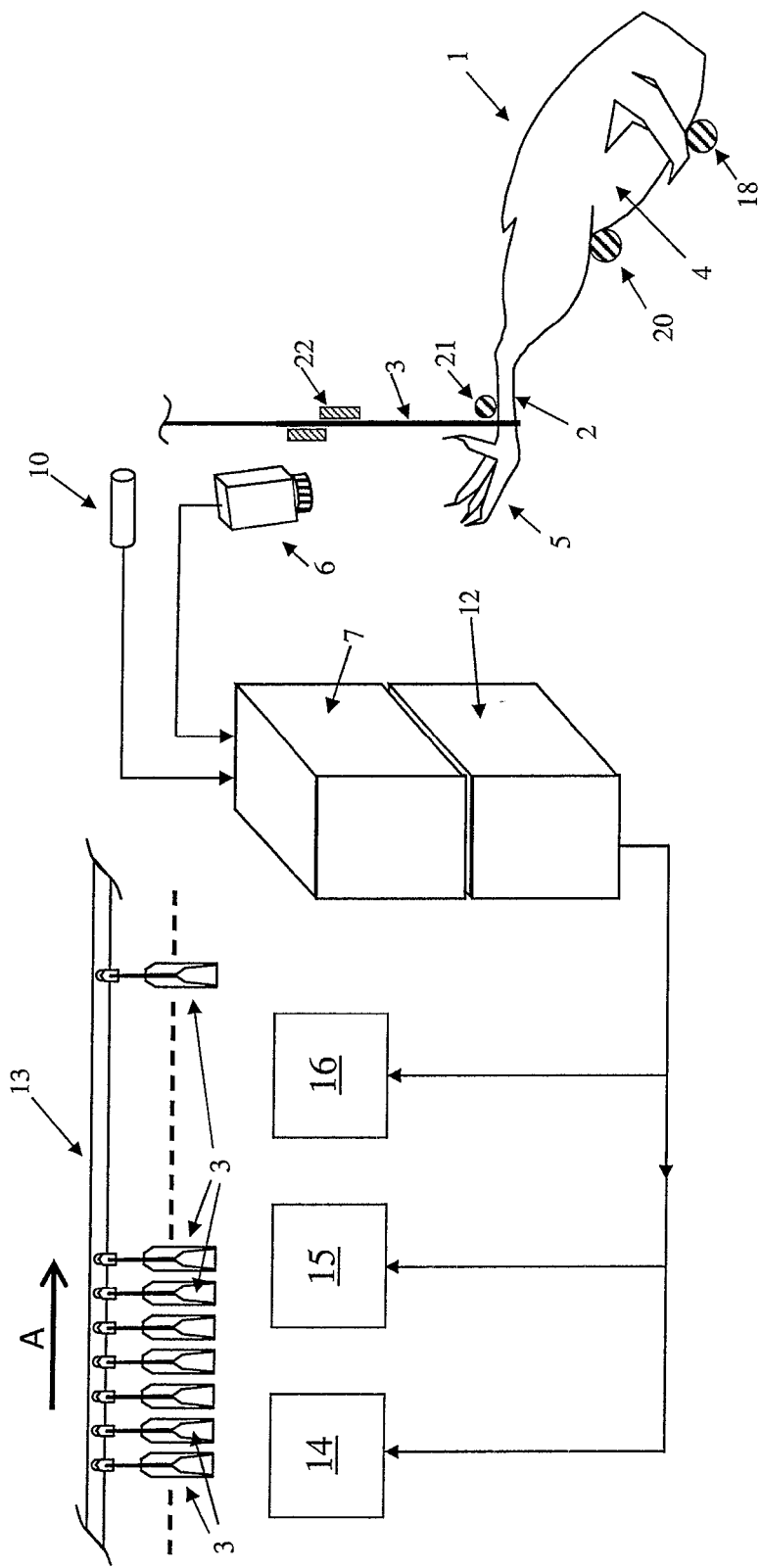
FIG. 2 provides another exemplary embodiment of a method and apparatus of the present invention, wherein as processing step a foot pad inspection is performed.

A more preferable variant is shown in FIG. 2, which will be further explained. FIG. 2 also shows an apparatus for processing poultry 1 suspended by the feet 2 from a conveyor hook 3, wherein the poultry 1 is already moved into the optimal orientation for carrying out a foot pad inspection, which orientation corresponds to the one discussed above with reference to FIG. 3C. While this orientation is not strictly necessary for carrying out a foot pad inspection, the orientation shown in FIG. 3C (and FIG. 2) is eminently suitable for this purpose.

FIG. 2 further shows that a foot pad inspection device 6, 7 is present for inspecting the foot pad of a claw 5 of a foot 2 of the poultry 1. This foot pad inspection device 6, 7 includes an image recorder, preferably a camera 6, for obtaining an image record of the foot pad of the claw 5 referred to.

There is further preferably provided an image identification and classification device 7 coupled with the image recorder 6 for sorting the poultry 1 into a predetermined quality grade. In the case shown, the image identification and classification device 7 is equipped such that this sorting into a quality grade can take place fully automatically.

The apparatus is further provided with control means 12 coupled—via the image identification and classification device 7—with the image recorder 6 for the adjustment of at least one processing apparatus of a slaughter line, subject to the obtained image recording of the foot pad. FIG. 2 illustrates this by means of a schematic representation of a chain conveyor 13, suspended from which there is a series of conveyor hooks 3 that may hold poultry, which may undergo predetermined processing steps by the processing apparatuses 14, 15, and 16. Depending on the image records obtained, the control means 12 can control each of these processing apparatuses 14, 15, 16 to perform or refrain from performing a processing step on the poultry 1. To this end the control means 12 are able to activate or deactivate such a processing apparatus 14, 15, 16 of the slaughter line, they may adjust these processing apparatuses 14, 15, 16 to a predetermined setting, but it is also possible that the poultry sorted into a particular quality grade is allowed to bypass a processing apparatus 14, 15, 16 in order to avoid the respective processing step. The processing apparatus 14, 15, 16 may also be an ejection device for releasing poultry from a conveyor hook 3 of the chain conveyor 13.

Figure 4:
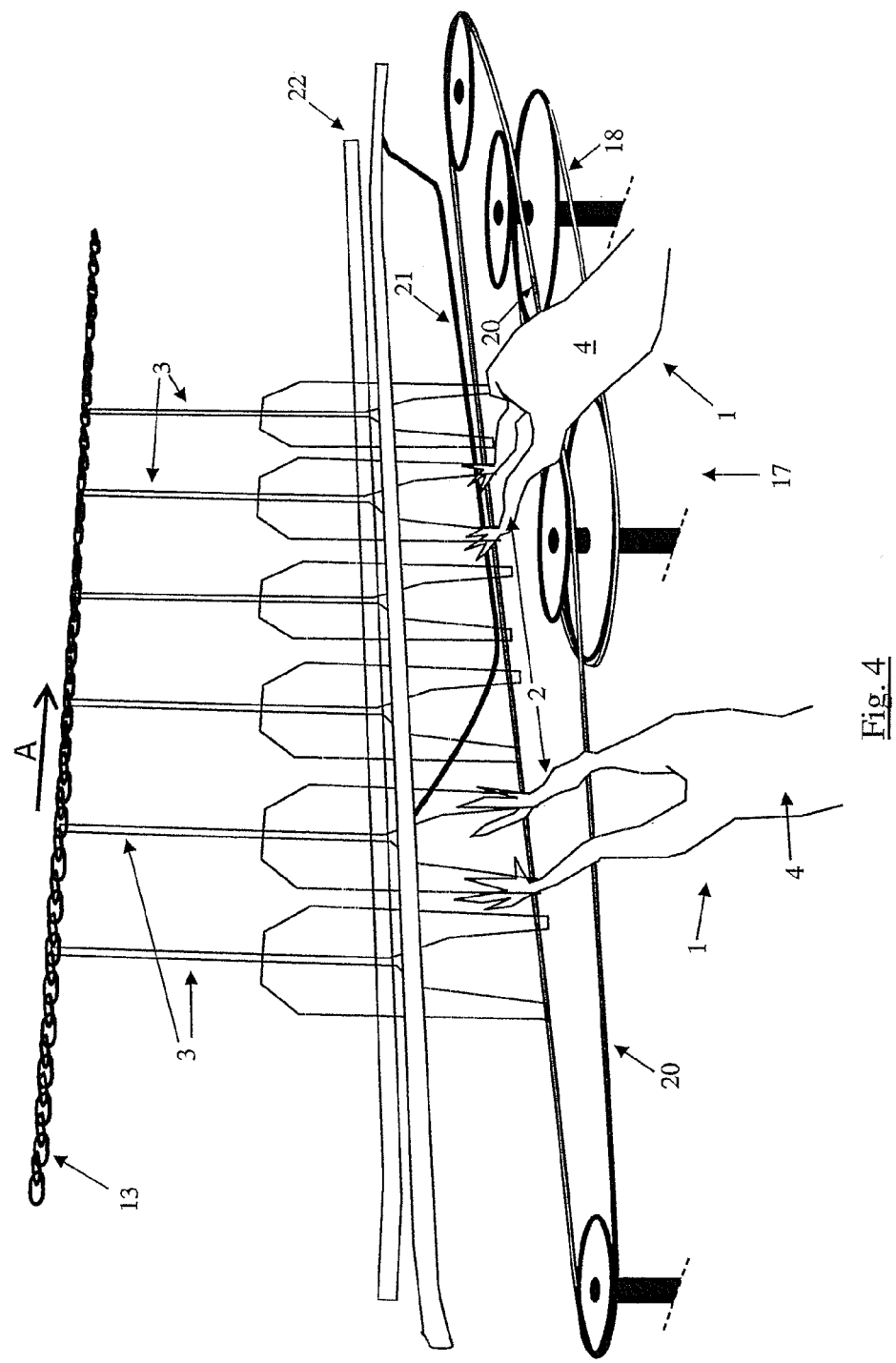
FIG. 4 provides an exemplary embodiment of a positioning device for the feet of the poultry in relation to a conveyor hook.
Figure 5:
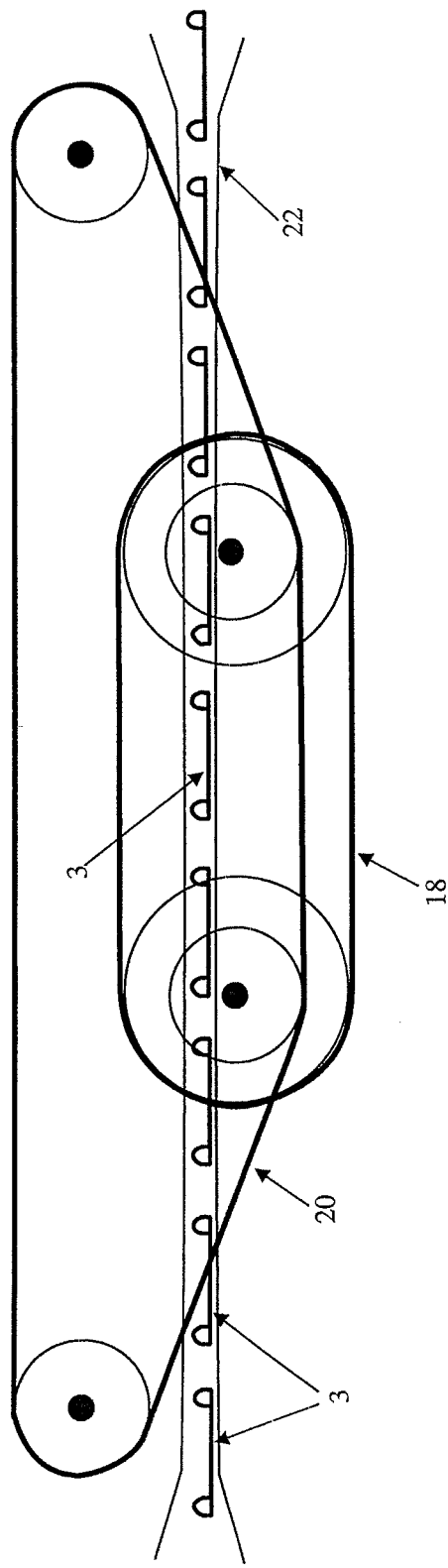
FIG. 5 is a schematic top view of the exemplary positioning device shown in FIG. 4.

In a particular aspect, the present invention relates to a positioning device as shown in FIG. 4. Specifically, FIG. 4 relates to a positioning device generally identified with reference numeral 17 and serving for positioning the foot 2 or feet of the poultry 1 in order to facilitate a processing step such as inspecting the foot pad of the claw of such a foot 2, as mentioned above. The apparatus 17 includes at least a first guide 18 (see also the top view in FIG. 5), which may be stationary but is preferably embodied as a moving guide in the form of, for example, a wire. During use, wire 18 moves at a speed that is adjusted to the transportation speed of the conveyor hooks 3 such that the wire 18 moves synchronously with the conveyance of the poultry 1 that is suspended from the conveyor hooks 3.

During the movement in the direction of arrow A of the conveyor hooks 3 suspended from the chain conveyor 13, a carcass 4 of the poultry 1, which is initially suspended from the conveyor hook 3 in a perpendicular orientation and more or less vertically, is moved in the direction of the positioning device 17. When reaching the positioning device 17, the carcass 4 of the poultry 1 rests against the first guide 18 causing the carcass 4 to be gradually moved from under the conveyor hook 3 to outside the path of the conveyor hook 3, while the feet 2 of the poultry 1 remain in contact with the conveyor hook 3. For the support of the poultry 1, an optional second guide 20 may be used, although this is not necessary.

Through the action of the positioning device 17, the position of the foot 2 of the poultry 1 in relation to the conveyor hook 3 is changed from a starting position, in which the poultry is suspended by the feet 2 from the conveyor hook 3 perpendicularly or freely, to a position in which the feet 2 are suspended from the conveyor hook 3 in an oblique orientation, with the feet 2 maintaining substantially a same orientation in relation to the carcass 4 of the poultry 1 as in the starting position. In this respect, reference is again made to the above given description and explanation concerning FIGS. 3A and 3C.

FIG. 4 shows that a locking device 21 is provided for the feet 2 of the poultry 1 suspended from the conveyor hook 3. In the case shown, this locking device 21 is embodied as a blocking rod 21 extending in its operational portion near and above the lower side of the conveyor hook 3 such that during operation, the feet 2 of the poultry 1 are positioned directly below the blocking rod 21.

FIG. 1, FIG. 2 and FIG. 3C clearly show how the blocking rod 21 works. FIG. 1, FIG. 2, FIG. 3C and FIG. 4 also show that the conveyor hook 3 cooperates with a linear guide 22 for maintaining a vertical orientation of the conveyor hook 3, which is useful in the situation where the carcass 4 of the poultry 1 is moved outside the plane of movement of the conveyor hook 3.

Considering the above description and explanation it will be obvious that the invention is embodied in various aspects of a method and apparatus for processing poultry suspended by the feet from a conveyor hook, and that these aspects are applicable in combination as well as each separately.

It will also be obvious that the invention is not limited to the explanation provided by way of the drawing and several exemplary embodiments, but that this explanation merely serves to elucidate any lack of clarity in the appended claims, without limiting these patent claims to the given specific exemplary embodiments. The protective scope due the appended claims is therefore determined exclusively by their formulation which is representative for the underlying inventive principle.

The invention claimed is:

1. An apparatus for processing poultry suspended by the feet from a conveyor hook, comprising:
   a processing apparatus for a foot of the poultry, the processing apparatus comprising a foot pad inspection apparatus that includes an image recorder for obtaining an image recordal of the foot pad;
   an image recorder for obtaining an image recordal of the foot pad; and
   an image identification and classification device coupled with the image recorder for sorting the poultry into a predetermined quality category.

2. An apparatus for processing poultry suspended by the feet from a conveyor hook as in claim 1, further comprising a control means coupled with the image recorder for, depending on the image recordal obtained, adjusting at least one processing apparatus of a slaughter line for the poultry, activating or deactivating such a processing apparatus of the slaughter line and/or causing the poultry to bypass such a processing apparatus of the slaughter line.

3. An apparatus for processing poultry suspended by the feet from a conveyor hook as in claim 1, further comprising a positioning device designed for positioning a foot of the poultry in relation to the conveyor hook in which the foot is placed.

4. An apparatus for processing poultry suspended by the feet from a conveyor hook as in claim 3, wherein the positioning device is designed for positioning the foot in relation to the conveyor hook such that the claw is open.

5. An apparatus for processing poultry suspended by the feet from a conveyor hook as in claim 3, wherein the positioning device is designed for positioning the foot of the poultry in relation to the conveyor hook at an angle that is smaller than 180°.

6. An apparatus for processing poultry suspended by the feet from a conveyor hook as in claim 5, wherein the angle is approximately 90°.

7. An apparatus for processing poultry suspended by the feet from a conveyor hook as in claim 3, wherein the positioning device possesses at least one first guide against which, during operation, a poultry carcass rests, said first guide configured for taking this carcass from below the conveyor hook to outside the path of the conveyor hook, while the feet of the poultry remain in contact with the conveyor hook.

8. An apparatus for processing poultry suspended by the feet from a conveyor hook as in claim 7, wherein the at least one first guide is a movable guide, which moves synchronously with the movement of the poultry suspended from the conveyor hooks.

9. An apparatus for processing poultry suspended by the feet from a conveyor hook as in claim 7, wherein the conveyor hook cooperates with a second guide for maintaining a vertical orientation of the conveyor hook.

10. An apparatus for processing poultry suspended by the feet from a conveyor hook as in claim 7, further comprising a rocking device for the feet of the poultry in the conveyor hook.

11. An apparatus for processing poultry suspended by the feet from a conveyor hook as in claim 10, wherein the locking device is a blocking rod extending near and above the lower side of the conveyor hook such that during operation the feet of the poultry are situated directly beneath the blocking rod.

* * * * *